Patented Sept. 7, 1954

2,688,561

UNITED STATES PATENT OFFICE 2,688,561

EYE-PROTECTIVE OPHTHALMIC GLASS

William H. Armistead, Corning, N. Y., assignor to Corning Glass Works, Corning, N. Y., a corporation of New York No Drawing. Application April 27, 1953, Serial No. 351,493

8 Claims. (Cl. 106—52)

This invention relates to neutral or gray-colored ophthalmic crown glasses having substantial absorption for infrared and ultraviolet as well as visible radiations and having the optical and physical properties which characterize white spectacle crown and which have come to be accepted as a standard in the trade, whereby such glasses are particularly suitable for use in eye-corrective lenses. Such optical and physical properties, as is well known, include a refractive index of 1.523±0.001, an expansion coefficient of about 92 to 98×$10^{-7}$ per ° C. (between 0° and 300° C.), and a softening point between about 710° and 735° C. (By softening point is meant that temperature at which the viscosity of the glass is $10^{7.6}$ poises.)

Infrared and ultraviolet radiations are effectively absorbed by glasses containing FeO and $Fe_2O_3$ respectively, and these oxides are commonly utilized in glasses for these purposes. A glass containing both FeO and $Fe_2O_3$, melted under reducing conditions, has a greenish color which can be neutralized to gray by combination with the complementary purple color produced by NiO in glasses of the type $K_2O.RO.SiO_2$ where R is a bivalent metal of the second periodic group. The color of such a neutral colored glass is difficult to control, however, because the greenish complement tends to vary objectionably in hue depending upon the extent of the reduction.

As described in my copending applications, Serial No. 351,491 and Serial No. 351,492, filed concurrently herewith, the inclusion of $TiO_2$ in such a glass provides control of the hue of its greenish complement and thereby of the desired neutral color, as a result of which minor variations in the reducing conditions can be readily tolerated without the production of any deleterious effects.

Application Serial No. 351,492 specifically discloses such reduced neutral-colored glasses comprising essentially 50 to 75% $SiO_2$, 14 to 23% $K_2O$ and at least one glass-stabilizing oxide in the indicated proportion selected from the group consisting of up to 25% ZnO and up to 20% $B_2O_3$, the total oxides of such group being 6 to 30%, and containing glass-coloring components consisting of FeO and $Fe_2O_3$ totalling 0.3% to 4.5% computed as $Fe_2O_3$, 0.1% to 2% $TiO_2$, and 0.02% to 0.50% NiO, the ratio of the computed $Fe_2O_3$/NiO being 5/1 to 15/1, such essential constituents totalling at least 75%. $Na_2O$ and/or $Li_2O$ can also be included as essential constituents in such reduced neutral-colored glasses provided that the $Na_2O$ does not exceed 17%, the $Li_2O$ does not exceed 4%, the total $Na_2O$ and $Li_2O$ is not over 17%, and the total alkali metal oxide content does not exceed 25%. Preferably the amount of $K_2O$ does not exceed 20% and the total alkali metal oxide also does not exceed 20%. When $Na_2O$ and/or $Li_2O$ are present, moreover, the $K_2O$ content can be as low as 8% provided that the total alkali metal oxide content is at least 14%. In addition, auxiliary glass-stabilizing oxides including up to 12% BeO, up to 15% MgO, up to 20% CaO but not over 20% of MgO+CaO, up to 25% SrO, up to 25% CdO, up to 25% BaO, up to 15% $Al_2O_3$ and up to 10% $ZrO_2$ can optionally be present, either singly or in combination, within the indicated amounts provided that their total does not exceed 25%.

Such glasses provide desirable reduction of glare and are useful for various general ophthalmic purposes. I have also found, however, that the ZnO-containing glasses, by suitable control of their composition, can surprisingly be made to possess not only the desired neutral color but also the physical and optical properties characterizing standard ophthalmic crown; and this application is specifically directed to such ZnO-containing glasses.

These reduced neutral-colored ZnO-containing glasses comprise essentially 63% to 70% $SiO_2$, 8% to 19% $K_2O$, at least one alkali metal oxide in the indicated proportion selected from the group consisting of up to 10% $Na_2O$ and up to 4% $Li_2O$, the percentage of $Na_2O$ being at least 4% when only $K_2O$ and $Na_2O$ are present and the percentage of $Li_2O$ being at least 1% when only $K_2O$ and $Li_2O$ are present, the selected alkali metal oxide comprising $Li_2O$ when the percentage of $K_2O$ is between 16 and 19%, the total alkali metal oxides being 15% to 22%, and 5% to 17% ZnO, and contain glass-coloring components consisting of FeO and $Fe_2O_3$ totalling 0.3% to 4.5% computed as $Fe_2O_3$, 0.1% to 2% $TiO_2$, and 0.02% to 0.50% NiO, the ratio of the computed $Fe_2O_3$/NiO being 5/1 to 15/1, the essential constituents totalling at least 90%.

While the present glasses preferably consist of the indicated essential oxides, other glass-stabilizing oxides may also be included in an aggregate amount up to 10%. For example, up to 5% $Al_2O_3$ may advantageously be present; up to 5% $B_2O_3$ or up to 8% of one or more of the bivalent metal oxides BeO, MgO, CaO, SrO, CdO, and BaO, preferably either CaO or BaO, may also be included. If desired, $ZrO_2$ may also be utilized in amounts up to 5%.

The following glass compositions calculated from their respective batches to the oxide basis in parts by weight will illustrate the invention. (The amounts of the coloring oxide, NiO, being less than 0.50, are expressed to two significant places; but such practice is without significance in expressing the major constituents. Since the compositions total approximately, if not exactly, 100 the amounts given for the various constituents thereof can for practical purposes be called percent by weight.)

counteract the increasing bluish tendency due to the FeO and thus to maintain the desired greenish complement; and, when the proportionate amount of FeO is decreased, the $TiO_2$ content should be correspondingly decreased to avoid the yellowish tendency otherwise caused by $Fe_2O_3$ and $TiO_2$.

The total iron oxide content of the glass however, should be maintained within the limits set forth above, because an excess in the total FeO

|  | 1 | 2 | 3 | 4 | 5 | 6 | 7 | 8 |
|---|---|---|---|---|---|---|---|---|
| $SiO_2$ | 65.3 | 67.6 | 66.2 | 65 | 66 | 65.6 | 63.4 | 68.6 |
| $K_2O$ | 11.4 | 12 | 10 | 11 | 13.6 | 18 | 11 | 14 |
| $Na_2O$ | 7.0 | 7 | 7 | 6 | 4 | ----- | 8 | 4 |
| $Li_2O$ | ----- | ----- | ----- | ----- | 1 | 3 | ----- | 1 |
| ZnO | 11.1 | 6 | 15 | 13 | 10 | 6 | 9 | 6 |
| $Al_2O_3$ | 2.0 | 2 | ----- | ----- | 2 | 2 | 2 | ----- |
| $B_2O_3$ | ----- | ----- | ----- | 2 | ----- | ----- | 5 | ----- |
| $ZrO_2$ | ----- | ----- | ----- | 2 | ----- | ----- | ----- | 3 |
| CaO | ----- | ----- | ----- | ----- | ----- | ----- | ----- | ----- |
| $FeO+Fe_2O_3$ (Computed as $Fe_2O_3$) | 2.1 | 3.6 | 1.2 | 0.7 | 2.2 | 3.6 | 1 | 2.2 |
| $TiO_2$ | 0.9 | 1.5 | 0.5 | 0.3 | 1 | 1.5 | 0.5 | 1 |
| NiO | 0.18 | 0.33 | 0.10 | 0.05 | 0.22 | 0.33 | 0.10 | 0.20 |

The values of the refractive index expansion coefficient, and softening point of the above glasses are within the aforementioned ranges and, while any one value such as the refractive index may vary slightly according to the size of the melt or other controllable factors, adjustment can readily be made and the desired value obtained by suitable minor alteration of the batch or change in melting conditions. For example, composition 1 which is adapted for melting in tank furnaces has a refractive index of 1.523, an expansion coefficient of $96 \times 10^{-7}$, per °C., and a softening point of 728° C.

To provide the desired greenish complementary color of the iron oxides, the batches for the present glasses are melted under reducing conditions, advantageously by introducing part of the iron oxide content into each batch as a ferrous compound, for example as ferrous oxalate, or alternatively by including in a batch containing $Fe_2O_3$ a small amount of starch. Since the reducing agent for example the oxalate radical or the starch, is completely eliminated during melting of the batch, it is not included in the final compositions given above. The proportion of oxalate or starch or other reducing agent which produces the desired result will vary with the glass composition and/or the particular melting conditions. Less reducing agent is required for melting in a closed melting container or covered pot than for melting in an open melting container such as a tank. The exact amount of reducing agent for all conditions cannot therefore be stated, but for each condition it can readily be determined by trial. It is preferable to utilize ferrous oxalate as the reducing agent because glasses made from batches containing it fine more readily than glasses made from batches containing starch, sugar or carbon.

Due to the fact that FeO is a stronger glass-coloring oxide than $Fe_2O_3$, the ratio of the total iron oxides to NiO or the computed $Fe_2O_3/NiO$ ratio may, without change of the neutral color, vary between 5/1 and 15/1, depending upon the proportionate amount of FeO relative to that of $Fe_2O_3$ or the extent of reduction of the glass. To decrease the ratio within such limits requires an increase in the proportionate amount of FeO or a stronger reduction and to increase the ratio requires a decrease in the proportionate amount of FeO or a weaker reduction. When the proportionate amount of FeO is thus increased, the $TiO_2$ content should be correspondingly increased to and $Fe_2O_3$ causes the general color of the glass to appear too green while a deficiency causes it to appear too red. The color due to iron is not substantially changed when the glass is tempered, that is, heated nearly to its softening point and suddenly cooled uniformly through several hundred degrees C.

With an excess of $TiO_2$ the color of the glass tends too much towards amber and with a deficiency the color tends too much towards blue.

An excess of NiO causes the color of the glass to appear too purple and a deficiency of NiO causes the color to appear too green. The color due to NiO is intensified by tempering the glass; consequently, if the glass is to be tempered, the NiO content should be lowered slightly, generally on the order of about 0.02%.

It is essential that no glass-coloring oxide other than FeO, $Fe_2O_2$, $TiO_2$ and NiO be present in the glasses of this invention because the desired neutral color cannot otherwise be obtained.

The color of the present glass is also influenced to some extent by the selection and/or combination of certain of the optional constituents. For example, the purple complement of the NiO tends to be shifted somewhat towards amber by an increasing content of BeO or MgO and, to a less extent of CaO unless the total alkali metal oxide content is near the maximum. On the other hand, the presence of SrO, CdO, BaO, $Al_2O_3$, or $ZrO_2$ in the glass within the above-stated limits has no substantial effect upon its color. $B_2O_3$ tends to strengthen the purple complement.

To maintain the desired properties of the present glasses including the refractive index, thermal expansion coefficient, and softening point, the proportions of the remaining constituents should be kept within the above-stated ranges for the following reasons:

An excess of $SiO_2$ results in a tendency for the refractive index of the glass to be undesirably low while a deficiency of $SiO_2$ results in the refractive index being too high.

An excess in the total amount of alkali metal oxide leads to an undesirably high expansion coefficient, but a deficiency causes too low an expansion coefficient and too high a softening point. Either $K_2O$ or $Na_2O$ in excess causes too high an expansion coefficient. Too much $Na_2O$ or $Li_2O$ lowers the softening point undesirably. The color of the glass also appears too amber if $K_2O$ is less than 8%.

An undesirably high refractive index results from an excess of ZnO or the other bivalent metal oxides mentioned above. An insufficient amount of ZnO may cause the glass to appear too amber in color especially if it contains substantial $Na_2O$.

An excess of $Al_2O_3$ or $ZrO_2$ raises the softening point of the glass undesirably. An excess of $B_2O_3$, on the other hand, tends to lower the softening point undesirably. Excessive $ZrO_2$ also tends to raise the refractive index too much.

If desired, PbO may also be included in amounts up to about 3% but more than this amount should be avoided because it not only raises the refractive index too much but tends to be reduced to metallic lead.

An important advantage of the present glasses is their capability of being edged substantially as rapidly as ordinary ophthalmic crown glasses. As is known, an ophthalmic lens is customarily edged or finished to its final peripheral shape after its faces have been ground with loose abrasives and polished to specified curvatures. Edge-grinding of the lens is accomplished by contacting its edge with a rotating wet grinder composed of a bonded abrasive. Such a grinder of course normally cuts more slowly than loose abrasives, which cannot be utilized for edging without undesirably producing scratches on the polished faces of the lens. For reasons not known, however, the edging of various prior neutral-colored ophthalmic lenses by the use of conventional edge-grinders is unusually slow and has been known to require up to ten times as long as that of ordinary ophthalmic crown lenses. No such difficulty is encountered with lenses made from the glasses of this invention.

As indicated above, glasses of the present type in which the essential glass-stabilizing oxide is either ZnO or $B_2O_3$ are broadly described and claimed in my aforementioned application Serial No. 351,492; and glasses of the present type in which the essential glass-stabilizing oxide is either BeO, MgO, CaO, SrO, CdO, BaO, $Al_2O_3$ or $ZrO_2$ are broadly described in my aforementioned co-pending application Serial No. 351,492.

What is claimed is:

1. A reduced, substantially neutral-colored, infrared-absorbing and ultraviolet-absorbing glass having a refractive index ($nD$) of about 1.523±0.001, an expansion coefficient of about 92 to 98×10$^{-7}$ per °C. and a softening point between about 710° and 735° C., and comprising essentially 63 to 70% $SiO_2$, 8 to 19% $K_2O$, at least one alkali metal oxide in the indicated proportion selected from the group consisting of up to 10% $Na_2O$ and up to 4% $Li_2O$, the percentage of $Na_2O$ being at least 4% when only $K_2O$ and $Na_2O$ are present and the percentage of $Li_2O$ being at least 1% when only $K_2O$ and $Li_2O$ are present, the selected alkali metal oxide comprising $Li_2O$ when the percentage of $K_2O$ is between 16 and 19%, the total alkali metal oxides being 15 to 22%, and 5 to 17% ZnO, and containing glass-coloring components consisting of FeO and $Fe_2O_3$ totalling 0.3 to 4.5% computed as $Fe_2O_3$, 0.1 to 2% $TiO_2$, and 0.02 to 0.50% NiO, the ratio of the computed $Fe_2O_3$/NiO being from 5/1 to 15/1, the essential constituents totalling at least 90%.

2. A reduced, substantially neutral-colored, infrared-absorbing and ultraviolet-absorbing glass having a refractive index ($nD$) of about 1.523±0.001, an expansion coefficient of about 92 to 98×10$^{-7}$ per °C. and a softening point between about 710° and 735° C., and comprising essentially 63 to 70% $SiO_2$, 8 to 19% $K_2O$, at least one alkali metal oxide in the indicated proportion selected from the group consisting of up to 10% $Na_2O$ and up to 4% $Li_2O$, the percentage of $Na_2O$ being at least 4% when only $K_2O$ and $Na_2O$ are present and the percentage of $Li_2O$ being at least 1% when only $K_2O$ and $Li_2O$ are present, the selected alkali metal oxide comprising $Li_2O$ when the percentage of $K_2O$ is between 16 and 19%, the total alkali metal oxides being 15 to 22%, and 5 to 17% ZnO, and containing glass-coloring components consisting of FeO and $Fe_2O_3$ totalling 0.3 to 4.5% computed as $Fe_2O_3$, 0.1 to 2% $TiO_2$ and 0.02 to 0.50% NiO, the ratio of the computed $Fe_2O_3$/NiO being from 5/1 to 15/1, the essential constituents totalling at least 90%, and up to 5% $Al_2O_3$.

3. A reduced, substantially neutral-colored, infrared-absorbing and ultraviolet-absorbing glass having a refractive index ($nD$) of about 1.523±0.001, an expansion coefficient of about 92 to 98×10$^{-7}$ per °C. and a softening point between about 710° and 735° C., and comprising essentially 63 to 70% $SiO_2$, 8 to 19% $K_2O$, at least one alkali metal oxide in the indicated proportion selected from the group consisting of up to 10% $Na_2O$ and up to 4% $Li_2O$, the percentage of $Na_2O$ being at least 4% when only $K_2O$ and $Na_2O$ are present and the percentage of $Li_2O$ being at least 1% when only $K_2O$ and $Li_2O$ are present, the selected alkali metal oxide comprising $Li_2O$ when the percentage of $K_2O$ is between 16 and 19%, the total alkali metal oxides being 15 to 22%, and 5 to 17% ZnO, and containing glass-coloring components consisting of FeO and $Fe_2O_3$ totalling 0.3 to 4.5% computed as $Fe_2O_3$, 0.1 to 2% $TiO_2$ and 0.02 to 0.50% NiO, the ratio of the computed $Fe_2O_3$/NiO being from 5/1 to 15/1, the essential constituents totalling at least 90%, and up to 5% $B_2O_3$.

4. A reduced, substantially neutral-colored, infrared-absorbing and ultraviolet-absorbing glass having a refractive index ($nD$) of about $$1.523 \pm 0.001$$

an expansion coefficient of about 92 to 98×10$^{-7}$ per °C. and a softening point between about 710° and 735° C., and comprising essentially 63 to 70% $SiO_2$, 8 to 19% $K_2O$, at least one alkali metal oxide in the indicated proportion selected from the group consisting of up to 10% $Na_2O$ and up to 4% $Li_2O$, the percentage of $Na_2O$ being at least 4% when only $K_2O$ and $Na_2O$ are present and the percentage of $Li_2O$ being at least 1% when only $K_2O$ and $Li_2O$ are present, the selected alkali metal oxide comprising $Li_2O$ when the percentage of $K_2O$ is between 16 and 19%, the total alkali metal oxides being 15 to 22%, and 5 to 17% ZnO, and containing glass-coloring components consisting of FeO and $Fe_2O_3$ totalling 0.3 to 4.5% computed as $Fe_2O_3$, 0.1 to 2% $TiO_2$ and 0.02 to 0.50% NiO, the ratio of the computed $Fe_2O_3$/NiO being from 5/1 to 15/1, the essential constituents totalling at least 90%, up to 5% $Al_2O_3$ and up to 5% $B_2O_3$.

5. A reduced, substantially neutral-colored, infrared-absorbing and ultraviolet-absorbing glass having a refractive index ($nD$) of about $$1.523 \pm 0.001$$

an expansion coefficient of about 92 to 98×10$^{-7}$ per °C. and a softening point between about 710° and 735° C., and comprising essentially 63 to 70% $SiO_2$, 8 to 19% $K_2O$, at least one alkali metal oxide in the indicated proportion selected from the group consisting of up to 10% $Na_2O$ and up to 4% Li$_2$O, the percentage of Na$_2$O being at least 4% when only K$_2$O and Na$_2$O are present and the percentage of Li$_2$O being at least 1% when only K$_2$O and Li$_2$O are present, the selected alkali metal oxide comprising Li$_2$O when the percentage of K$_2$O is between 16 and 19%, the total alkali metal oxides being 15 to 22%, and 5 to 17% ZnO, and containing glass-coloring components consisting of FeO and Fe$_2$O$_3$ totalling 0.3 to 4.5% computed as Fe$_2$O$_3$, 0.1 to 2% TiO$_2$ and 0.02 to 0.50% NiO, the ratio of the computed Fe$_2$O$_3$/NiO being from 5/1 to 15/1, the essential constituents totalling at least 90%, and up to 8% of at least one bivalent metal oxide selected from the group consisting of BeO, MgO, CaO, SrO, CdO and BaO.

6. A reduced, substantially neutral-colored, infrared-absorbing and ultraviolet-absorbing glass having a refractive index ($nD$) of about $$1.523 \pm 0.001$$

an expansion coefficient of about 92 to 98$\times 10^{-7}$ per °C. and a softening point between about 710° and 735° C., and comprising essentially 63 to 70% SiO$_2$, 8 to 19% K$_2$O, at least one alkali metal oxide in the indicated proportion selected from the group consisting of up to 10% Na$_2$O and up to 4% Li$_2$O, the percentage of Na$_2$O being at least 4% when only K$_2$O and Na$_2$O are present and the percentage of Li$_2$O being at least 1% when only K$_2$O and Li$_2$O are present, the selected alkali metal oxide comprising Li$_2$O when the percentage of K$_2$O is between 16 and 19%, the total alkali metal oxides being 15 to 22%, and 5 to 17% ZnO, and containing glass-coloring components consisting of FeO and Fe$_2$O$_3$ totalling 0.3 to 4.5% computed as Fe$_2$O$_3$, 0.1 to 2% TiO$_2$ and 0.02 to 0.50% NiO, the ratio of the computed Fe$_2$O$_3$/NiO being from 5/1 to 15/1, the essential constituents totalling at least 90%, up to 5% B$_2$O$_3$, and up to 8% of at least one bivalent metal oxide selected from the group consisting of BeO, MgO, CaO, SrO, CdO and BaO.

7. A reduced, substantially neutral-colored, infrared-absorbing and ultraviolet-absorbing glass having a refractive index ($nD$) of about $$1.523 \pm 0.001$$

an expansion coefficient of about 92 to 98$\times 10^{-7}$ per °C. and a softening point between about 710° and 735° C., and comprising essentially 63 to 70% SiO$_2$, 8 to 19% K$_2$O, at least one alkali metal oxide in the indicated proportion selected from the group consisting of up to 10% Na$_2$O and up to 4% Li$_2$O, the percentage of Na$_2$O being at least 4% when only K$_2$O and Na$_2$O are present and the percentage of Li$_2$O being at least 1% when only K$_2$O and Li$_2$O are present, the selected alkali metal oxide comprising Li$_2$O when the percentage of K$_2$O is between 16 and 19%, the total alkali metal oxides being 15 to 22%, and 5 to 17% ZnO, and containing glass-coloring components consisting of FeO and Fe$_2$O$_3$ totalling 0.3 to 4.5% computed as Fe$_2$O$_3$, 0.1 to 2% TiO$_2$ and 0.02 to 0.50% NiO, the ratio of the computed Fe$_2$O$_3$/NiO being from 5/1 to 15/1, the essential constituents totalling at least 90%, and up to 5% ZrO$_2$.

8. A reduced, substantially neutral-colored, infrared-absorbing and ultraviolet-absorbing glass having the approximate composition 65.3% SiO$_2$, 11.4% K$_2$O, 7% Na$_2$O, 11.1% KnO, 2% Al$_2$O$_3$, FeO and Fe$_2$O$_3$ totalling 2.1% computed as Fe$_2$O$_3$, 0.9% TiO$_2$, and 0.21% NiO.

No references cited.